(12) United States Patent
Noguchi et al.

(10) Patent No.: US 10,871,651 B2
(45) Date of Patent: Dec. 22, 2020

(54) DISPLAY DEVICE AND LIGHT-GUIDING DEVICE

(71) Applicant: SEIKO EPSON CORPORATION, Tokyo (JP)

(72) Inventors: Toshiyuki Noguchi, Shiojiri (JP); Masafumi Sakaguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 147 days.

(21) Appl. No.: 16/257,799

(22) Filed: Jan. 25, 2019

(65) Prior Publication Data
US 2019/0235249 A1 Aug. 1, 2019

(30) Foreign Application Priority Data

Jan. 26, 2018 (JP) .................................. 2018-011305

(51) Int. Cl.
*G02B 27/01* (2006.01)
*G02B 27/42* (2006.01)
*G02B 5/18* (2006.01)

(52) U.S. Cl.
CPC ....... *G02B 27/0172* (2013.01); *G02B 5/1842* (2013.01); *G02B 5/1861* (2013.01); *G02B 27/4205* (2013.01); *G02B 2027/011* (2013.01); *G02B 2027/0147* (2013.01); *G02B 2027/0174* (2013.01); *G02B 2027/0178* (2013.01)

(58) Field of Classification Search
CPC ............ G02B 27/0172; G02B 27/4205; G02B 5/1842; G02B 5/1861; G02B 2027/0147; G02B 2027/0174; G02B 2027/0178; G02B 2027/011; G02B 27/4272; G02B 5/1814; G02B 2027/0112; G02B 27/0103; G02B 2027/0181; G02B 2027/0183
USPC ......................................................... 359/13
See application file for complete search history.

(56) References Cited

U.S. PATENT DOCUMENTS

| 2002/0039232 A1 | 4/2002 | Takeyama |
| 2016/0161755 A1 | 6/2016 | Yonekubo et al. |
| 2016/0252742 A1 | 9/2016 | Wakabayashi |

(Continued)

FOREIGN PATENT DOCUMENTS

| JP | 2002-139695 A | 5/2002 |
| JP | 2010-033026 A | 2/2010 |

(Continued)

*Primary Examiner* — William R Alexander
*Assistant Examiner* — Henry A Duong
(74) *Attorney, Agent, or Firm* — Oliff PLC

(57) ABSTRACT

A display device includes a first diffraction element that deflects image light and causes the image light to be incident on an eye of an observer, and a second diffraction element disposed between an image light projecting device and the first diffraction element. A diffraction direction of the first diffraction element and the second diffraction element is set depending on whether a sum of the number of reflections of light and the number of times of generating intermediate image between the second diffraction element and the first diffraction element is an even number or an odd number. For example, when the sum is an even number, a direction in which light incident on a first incident surface is diffracted at the highest diffraction efficiency is the same direction as a direction in which light incident on a second incident surface is diffracted at the highest diffraction efficiency.

9 Claims, 10 Drawing Sheets

(56) References Cited

U.S. PATENT DOCUMENTS

| | | |
|---|---|---|
| 2017/0261751 A1 | 9/2017 | Noguchi et al. |
| 2018/0151194 A1 | 5/2018 | Noguchi |
| 2020/0132995 A1* | 4/2020 | Harada ................ H04N 9/3138 |

FOREIGN PATENT DOCUMENTS

| | | |
|---|---|---|
| JP | 2016-109923 A | 6/2016 |
| JP | 2016-161669 A | 9/2016 |
| JP | 2017-167181 A | 9/2017 |
| JP | 2018-087949 A | 6/2018 |

* cited by examiner

DISPLAY DEVICE AND LIGHT-GUIDING DEVICE

BACKGROUND

1. Technical Field

The invention relates to a display device that displays an image using a diffraction element and a light-guiding device.

2. Related Art

As a device using a diffraction element such as a holographic element, a hologram record reproducing device, a display device that causes image light to be incident on an eye of a user with a diffraction element, and the like can be exemplified. Pitches of interference fringes are optimized in a holographic element to obtain the highest diffraction efficiency at a specific wavelength. However, as illustrated in FIG. 10, respective bands $\lambda R$, $\lambda G$, and $\lambda B$ of red light (R), green light (G), and blue light (B) have a spectrum width to some extent depending on a kind of a light source, and light having a wavelength deviated from a specific wavelength causes a decrease in resolution.

On the other hand, an observation optical system is conceivable that includes a reflection-type volume hologram that deflects light emitted from a light source and also includes a transmission-type volume hologram in an optical path from the light source to the reflection-type volume hologram (see JP-A-2002-139695).

However, when the transmission-type volume hologram and the reflection-type volume hologram are disposed as in the optical system described in JP-A-2002-139695, light having a wavelength deviated from a specific wavelength reaches a position greatly deviated from a target arrival point, which may decrease resolution. Also, when the transmission-type volume hologram and the reflection-type volume hologram are disposed as in the optical system described in JP-A-2002-139695 with an optical part such as a mirror and a lens disposed in the optical path from the transmission-type volume hologram to the reflection-type volume hologram for reducing the size of the device and correcting various aberrations, light having a wavelength deviated from a specific wavelength reaches a position greatly deviated from a target arrival point, which may decrease resolution.

SUMMARY

An advantage of some aspects of the invention is to provide a display device and a light-guiding device capable of suppressing a decrease in resolution even when wavelength fluctuations occur in light emitted from a light source.

A display device according to an aspect of the invention includes an image light generating device configured to emit image light, a first diffraction element of a reflection type configured to deflect the image light incident on a first incident surface toward an eye of an observer, and a transmission-type second diffraction element disposed in an optical path between the image light generating device and the first diffraction element and configured to deflect the image light incident on a second incident surface toward the first diffraction element. The first diffraction element and the second diffraction element are disposed in such a way that, when a sum of the number of reflections of light and the number of times of generating intermediate image between the second diffraction element and the first diffraction element is an even number, a direction in which light incident on the first incident surface is diffracted at the highest diffraction efficiency is the same direction as a direction in which light incident on the second incident surface is diffracted at the highest diffraction efficiency when seen from a normal direction of a virtual surface including a normal direction of the first incident surface and a normal direction of the second incident surface, and when a sum of the number of reflections of light and the number of times of generating intermediate image between the second diffraction element and the first diffraction element is an odd number, a direction in which light incident on the first incident surface is diffracted at the highest diffraction efficiency is a direction different from a direction in which light incident on the second incident surface is diffracted at the highest diffraction efficiency when seen from the normal direction of the virtual surface. "A case where a sum of the number of reflections of light and the number of times of generating intermediate image between the second diffraction element and the first diffraction element is an even number" in the invention includes a case where the number of reflections of light and the number of times of generating intermediate image are both zero.

A light-guiding device according to an aspect of the invention includes a first diffraction element of a reflection type configured to deflect light incident on a first incident surface from a light source, and a second diffraction element of a transmission type disposed in an optical path between the light source and the first diffraction element and configured to deflect the light incident on a second incident surface toward the first diffraction element. The first diffraction element and the second diffraction element are disposed in such a way that, when a sum of the number of reflections of light and the number of times of generating intermediate image between the second diffraction element and the first diffraction element is an even number, a direction in which light incident on the first incident surface is diffracted at the highest diffraction efficiency is the same direction as a direction in which light incident on the second incident surface is diffracted at the highest diffraction efficiency when seen from a normal direction of a virtual surface including a normal direction of the first incident surface and a normal direction of the second incident surface, and when a sum of the number of reflections of light and the number of times of generating intermediate image between the second diffraction element and the first diffraction element is an odd number, a direction in which light incident on the first incident surface is diffracted at the highest diffraction efficiency is a direction different from a direction in which light incident on the second incident surface is diffracted at the highest diffraction efficiency when seen from the normal direction of the virtual surface.

According to an aspect of the invention, the first reflection-type diffraction element deflects image light emitted from the image light generating device and causes the image light to be incident on an eye of an observer, and the second transmission-type diffraction element is disposed between the light source of the image light generating device and the first diffraction element and absorbs wavelength fluctuations. Herein, the first diffraction element and the second diffraction element are holographic elements and blazed diffraction elements. The first diffraction element and the second diffraction element emit diffracted light having the highest diffraction efficiency in one direction when a light beam is incident from the normal direction. Thus, when the directions of the first diffraction element and the second diffraction element are improper, wavelength fluctuations cannot be absorbed and resolution greatly decreases due to the wavelength fluctuations. For this reason, according to an aspect of the invention, the first diffraction element and the second diffraction element are disposed appropriately depending on whether a sum of the number of reflections of light and the number of times of generating intermediate image between the second diffraction element and the first diffraction element is an even number or an odd number. Thus, even when wavelength fluctuations occur in light emitted from the light source, the wavelength fluctuations are canceled out in the first diffraction element and the second diffraction element. Accordingly, a decrease in resolution can be suppressed even when the wavelength fluctuations occur in the light emitted from the light source.

An aspect may be adopted in the invention where the first diffraction element is an element in which light incident from the normal direction of the first incident surface has the highest diffraction efficiency in a first direction, the second diffraction element is an element in which light incident from the normal direction of the second incident surface has the highest diffraction efficiency in a second direction, when a sum of the number of reflections of light and the number of times of generating intermediate image between the second diffraction element and the first diffraction element is an even number and the first direction and the second direction are directions different from each other when seen from the normal direction of the virtual surface including the normal direction of the first incident surface and the normal direction of the second incident surface, an angle which the normal direction of the second incident surface forms with an incident direction of light with respect to the second incident surface is greater than an angle which the normal direction of the second incident surface forms with a direction in which the light is emitted from an emitting surface of the second diffraction element at the highest diffraction efficiency, and when a sum of the number of reflections of light and the number of times of generating intermediate image between the second diffraction element and the first diffraction element is an even number and the first direction and the second direction are the same direction when seen from the normal direction of the virtual surface including the normal direction of the first incident surface and the normal direction of the second incident surface, an angle which the normal direction of the second incident surface forms with an incident direction of light with respect to the second incident surface is smaller than an angle which the normal direction of the emitting surface forms with the direction in which the light is emitted from the emitting surface at the highest diffraction efficiency.

An aspect may be adopted in the invention where the first diffraction element is an element in which light incident from the normal direction of the first incident surface has the highest diffraction efficiency in a first direction, the second diffraction element is an element in which light incident from the normal direction of the second incident surface has the highest diffraction efficiency in a second direction, when a sum of the number of reflections of light and the number of times of generating intermediate image between the second diffraction element and the first diffraction element is an odd number and the first direction and the second direction are directions different from each other when seen from the normal direction of the virtual surface including the normal direction of the first incident surface and the normal direction of the second incident surface, an angle which the normal direction of the second incident surface forms with an incident direction of light with respect to the second incident surface is smaller than an angle which the normal direction of the second incident surface forms with a direction in which the light is emitted from an emitting surface of the second diffraction element at the highest diffraction efficiency, and when a sum of the number of reflections of light and the number of times of generating intermediate image between the second diffraction element and the first diffraction element is an odd number and the first direction and the second direction are the same direction when seen from the normal direction of the virtual surface including the normal direction of the first incident surface and the normal direction of the second incident surface, an angle which the normal direction of the second incident surface forms with an incident direction of light with respect to the second incident surface is greater than an angle which the normal direction of the emitting surface forms with the direction in which the light is emitted from the emitting surface at the highest diffraction efficiency.

An aspect may be adopted in the invention where the first diffraction element is a reflection-type volume holographic element, and the second diffraction element is a transmission-type volume holographic element.

An aspect may be adopted in the invention where the first diffraction element and the second diffraction element are each provided with interference fringes of a plurality of kinds having different pitches.

An aspect may be adopted in the invention where the first diffraction element has a curved shape being recessed with respect to a peripheral portion.

An aspect may be adopted in the invention where the image light generating device includes an organic electroluminescent display element.

An aspect may be adopted in the invention where the image light generating device includes a liquid crystal device and an illumination light source.

BRIEF DESCRIPTION OF THE DRAWINGS

The invention will be described with reference to the accompanying drawings, wherein like numbers reference like elements.

FIG. 10 is a schematic diagram illustrating a spectrum of light source light and the like.

DESCRIPTION OF EXEMPLARY EMBODIMENTS

Exemplary embodiments of the invention will be described. Note that, in the following description, to make each of members a recognizable size, each of the members is illustrated to be different from an actual scale and an actual angle.

Exemplary Embodiment

Overall Configuration

Figure 1:
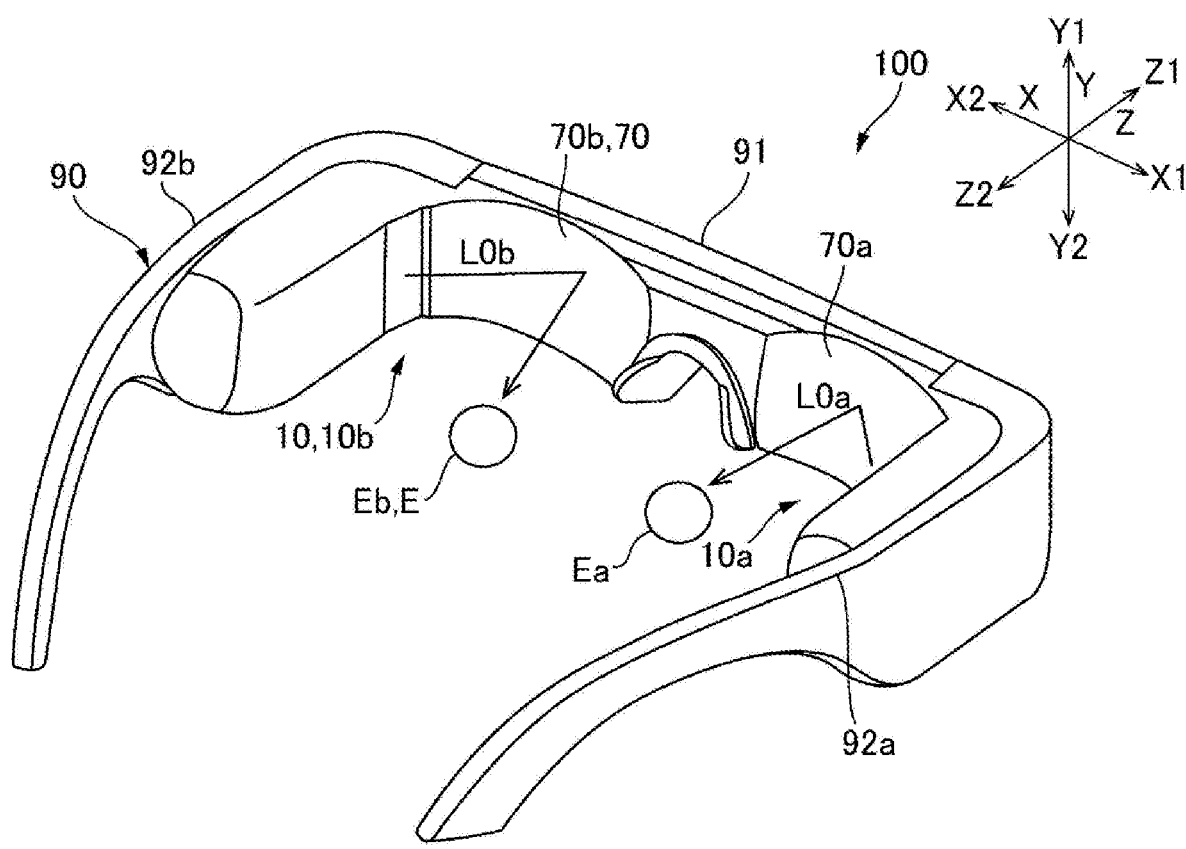
FIG. 1 is a schematic diagram illustrating one aspect of an external appearance of a display device to which the invention is applied.
Figure 2:
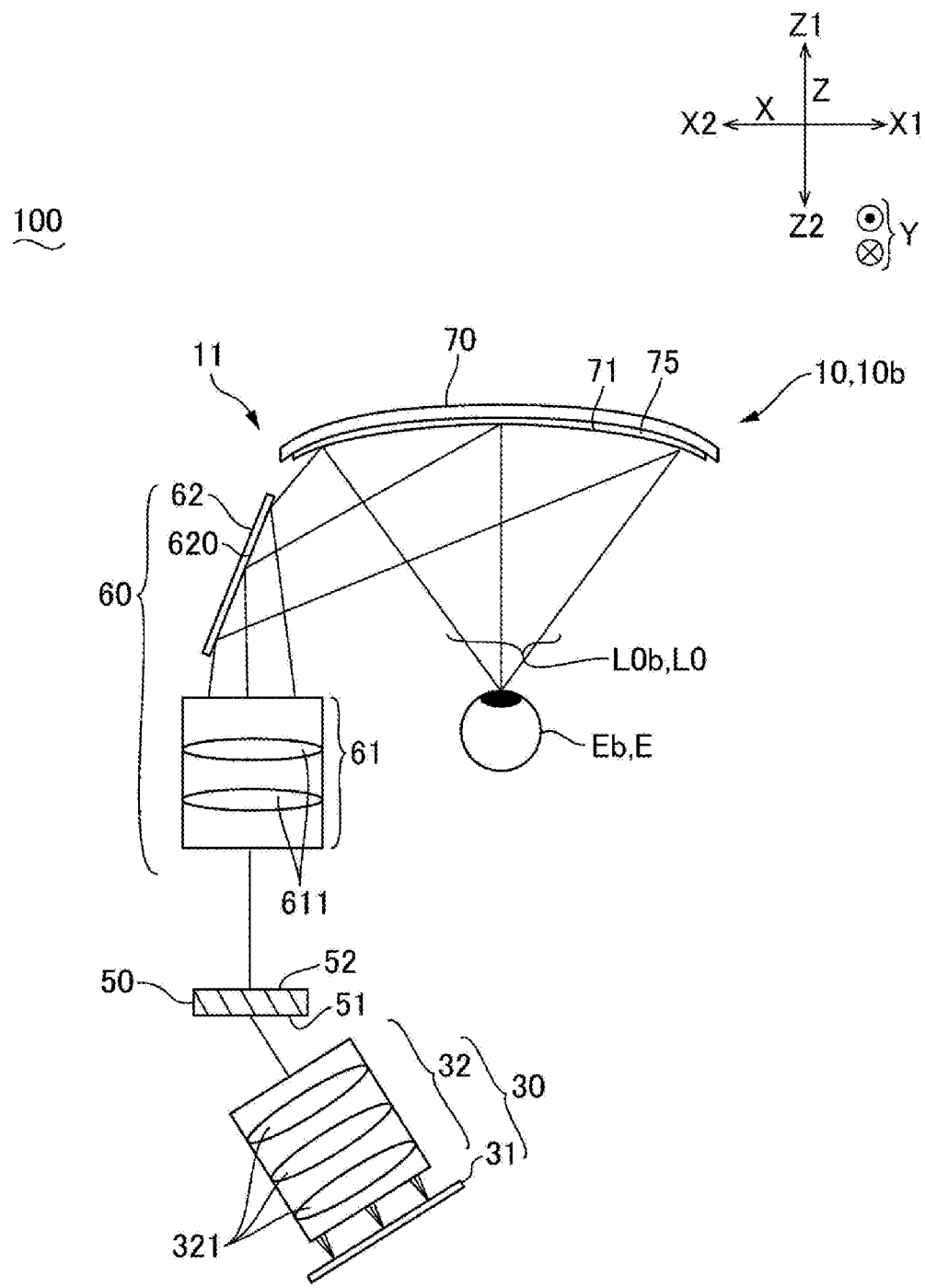
FIG. 2 is a schematic diagram illustrating one aspect of an optical system of the display device to which the invention is applied.

FIG. 1 is an external view illustrating one aspect of an external appearance of a display device 100 to which the invention is applied. FIG. 2 is a schematic diagram illustrating one aspect of an optical system 10 of the display device 100 illustrated in FIG. 1. Note that, in FIGS. 1 and 2, an anteroposterior direction, a front side, and a rear side are respectively indicated by Z, Z1, and Z2. A horizontal direction, a vertical direction, an upper side, and a lower side are respectively indicated by X, Y, Y1, and Y2. In FIG. 2 illustrating a left-eye optical system 10b, a right-and-left direction, a right side (nose side), and a left side (ear side) are respectively provided with X, X1, and X2. FIG. 2 illustrates a state when seen from a normal direction of a virtual surface including a normal direction of a first incident surface 71 of a first diffraction element 70 and a normal direction of a second incident surface 51 of a second diffraction element 50.

The display device 100 illustrated in FIG. 1 is a head-mounted display device, and includes a right-eye optical system 10a that causes image light L0a to be incident on a right eye Ea and the left-eye optical system 10b that causes image light L0b to be incident on a left eye Eb. For example, the display device 100 is formed in a shape like glasses. Specifically, the display device 100 includes a frame 90 that holds the right-eye optical system 10a and the left-eye optical system 10b. The frame 90 is mounted on a head of an observer. The frame 90 has a front portion 91 that holds a first diffraction element 70a of the right-eye optical system 10a and a first diffraction element 70b of the left-eye optical system 10b that are described later. A temple 92a on a right side of the frame 90 and a temple 92b on the left side respectively hold an image light projecting device of the right-eye optical system 10a and an image light projecting device of the left-eye optical system 10b that are described later.

The right-eye optical system 10a and the left-eye optical system 10b have the same basic configuration. Therefore, the right-eye optical system 10a and the left-eye optical system 10b will be described as the optical system 10 without distinction in the description below. FIG. 2 illustrates only the left-eye optical system 10b as the optical system 10, and description of the right-eye optical system 10a will be omitted.

As illustrated in FIG. 2, the optical system 10 includes the first reflection-type diffraction element 70 that deflects the image light L0 emitted from an image light projecting device 30 and causes the image light L0 to be incident on the eye E of the observer, and the second transmission-type diffraction element 50 that absorbs wavelength fluctuations in an optical path from the image light projecting device 30 to the first diffraction element 70. The optical system 10 includes a light-guiding device 11 including the first diffraction element 70 and the second diffraction element 50. The first diffraction element 70 and the second diffraction element 50 are holographic elements and blazed diffraction elements. The second diffraction element 50 and the first diffraction element 70 emit diffracted light having the highest diffraction efficiency in one direction when a light beam is incident from the normal direction.

In the optical system 10, with reference to the traveling direction of the image light L0 in the anteroposterior direction Z, the image light projecting device 30 emits the image light L0 toward the front side Z1 in the anteroposterior direction Z, and the image light L0 is incident on the second diffraction element 50. The second diffraction element 50 emits the incident image light L0 toward the front side Z1. The first diffraction element 70 emits the image light L0 emitted from the second diffraction element 50 toward the rear side Z2. The image light L0 emitted from the first diffraction element 70 is incident on the eye E of the observer.

In the exemplary embodiment, a light-guiding system 60 is disposed in the optical path from the second diffraction element 50 toward the first diffraction element 70. Thus, the image light L0 emitted from the second diffraction element 50 toward the front side Z1 in the anteroposterior direction Z is incident on the first diffraction element 70 via the light-guiding system 60.

The image light projecting device 30 includes an image light generating device 31 that generates the image light L0 and a projection optical system 32 that projects the image light L0 generated by the image light generating device 31 toward the front side Z1 in the anteroposterior direction Z. The projection optical system 32 includes a plurality of lenses 321. An aspect may be adopted where the image light generating device 31 includes a display panel 310 such as an organic electroluminescent display device (light source). The aspect can provide a small-sized display device 100 capable of displaying a high-quality image. Another aspect may be adopted where the image light generating device 31 includes an illumination light source (not illustrated) and a display panel 310 such as a liquid crystal display device that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light projecting device 30 modulates laser light emitted from a light source by a micromirror device.

The light-guiding system 60 includes a lens system 61 on which the image light L0 emitted from the second diffraction element 50 is incident and a reflection member 62 that emits, from the front side Z1 in the anteroposterior direction Z in a direction inclined diagonally toward the right side X1 in the right-and-left direction X, the image light L0 emitted from the lens system 61 toward the front side Z1 in the anteroposterior direction Z. The lens system 61 includes a plurality of lenses 611 disposed from the rear side Z2 toward the front side Z1 in the anteroposterior direction Z. The reflection member 62 includes a reflection surface 620 inclined diagonally toward the rear side Z2 in the anteroposterior direction Z. In the exemplary embodiment, the lens system 61 generates an intermediate image once.

Detailed Configuration of First Diffraction Element 70 and Others

Figure 3:
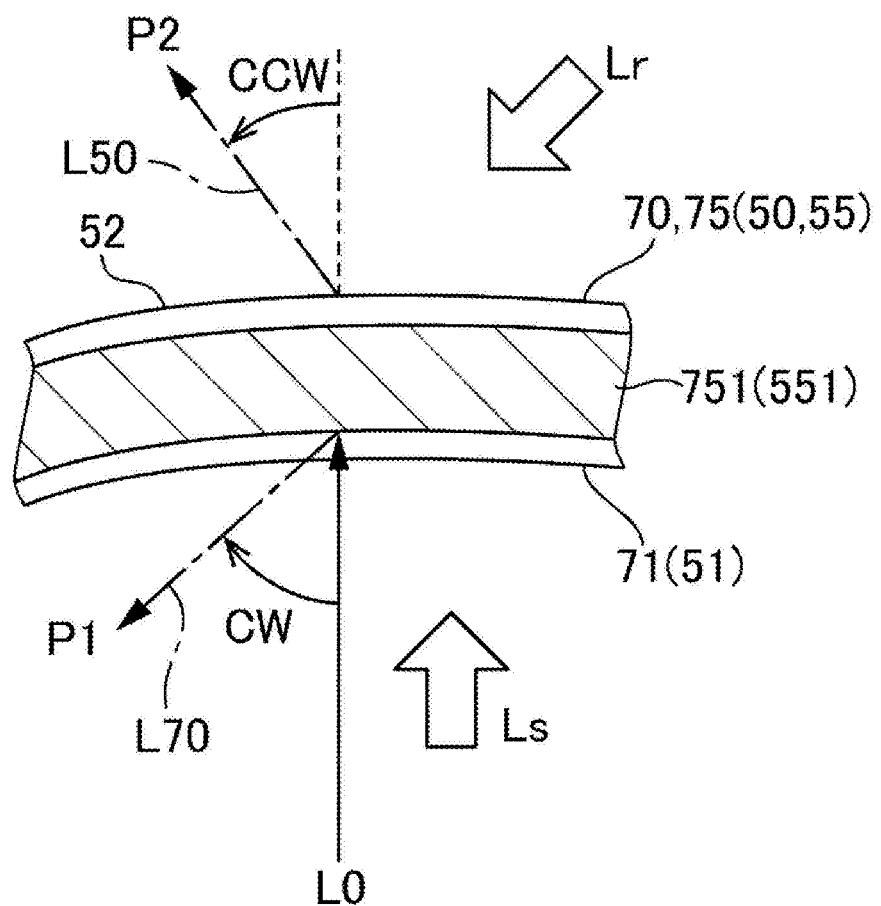
FIG. 3 illustrates a schematic diagram of a first diffraction element and a second diffraction element used in the display device to which the invention is applied.

FIG. 3 is a schematic diagram of interference fringes 751 of the first diffraction element 70 illustrated in FIG. 2. In FIG. 2, the first diffraction element 70 is a reflection-type volume holographic element 75 that is a partial reflection-type diffraction optical element. Thus, the first diffraction element 70 forms a partial transmissive reflective combiner. Therefore, external light is also incident on the eye E via the first diffraction element 70, and thus the observer can recognize an image in which the image light L0 formed by the image light generating device 31 and the external light (background) are superimposed on each other.

The first diffraction element 70 faces the eye E of the observer. The first incident surface 71 of the first diffraction element 70 on which the image light L0 is incident has a recessed curved surface being recessed in a direction away from the eye E. In other words, the first diffraction element 70 has a shape having a central portion recessed and curved with respect to a peripheral portion in the incident direction of the image light L0. Thus, the image light L0 can be efficiently condensed toward the eye E of the observer.

As illustrated in FIG. 3, the first diffraction element 70 includes the interference fringes 751 having a pitch corresponding to a specific wavelength. The interference fringes 751 are recorded as a difference in refractive index and the like in a hologram photosensitive layer. The interference fringes 751 are inclined in one direction with respect to the first incident surface 71 of the first diffraction element 70 so as to correspond to a specific incident angle. Therefore, as indicated by a dot-and-dash line L70, the first diffraction element 70 diffracts the image light L0 incident on the first incident surface 71 in a predetermined direction and emits the image light L0 from the first incident surface 71. The specific wavelength and the specific incident angle respectively correspond to a wavelength and an incident angle of the image light L0. The interference fringes 751 having the configuration can be formed by performing interference exposure on the holographic photosensitive layer by using reference light Lr and object light Ls.

The second diffraction element 50 is a transmission-type volume holographic element 55, and includes interference fringes 551 similarly to the first diffraction element 70. As indicated by a dot-and-dash line L50, the second diffraction element 50 diffracts the light emitted from the second incident surface 51 and emits the light from an emitting surface 52.

Herein, the second diffraction element 50 and the first diffraction element 70 are formed to cancel out a deviation in diffraction angle due to wavelengths. For example, a deviation in diffraction angle due to wavelengths can be canceled out by forming the second diffraction element 50 and the first diffraction element 70 such that the interference fringes 551 and 751 illustrated in FIG. 3 are equal in pitch and inclination in an in-plane direction. However, an aspect may be preferably adopted where the interference fringes 551 and 751 are different in pitch and inclination in the in-plane direction in consideration of an influence of an optical part disposed between the second diffraction element 50 and the first diffraction element 70. In this case, the interference fringes 551 and 751 may have different pitches or inclinations in consideration of the influence of the optical part in order to condense the image light L0 emitted from the first diffraction element 70. For example, since angles at which the image light L0 is diffracted to be incident on the eye of the observer are different at a central portion and an end portion in the first diffraction element 70, the interference fringes 751 may have different pitches accordingly. In this case, the pitch of the interference fringes 751 of the first diffraction element 70 is also preferably in a range from ½ times to 2 times of the pitch of the interference fringes 551 of the second diffraction element 50.

Definition of Diffraction Direction and Others

FIG. 3 illustrates whether a first direction P1 is clockwise CW or counterclockwise CCW assuming that a direction in which the light L0 incident from the normal direction of the first incident surface 71 is emitted from the first incident surface 71 at the highest diffraction efficiency is the "first direction P1" in the first reflection-type diffraction element 70. More specifically, FIG. 3 illustrates whether a direction in which the light L0 incident from the normal direction of the first incident surface 71 is emitted from the first incident surface 71 at the highest diffraction efficiency without being diffracted is clockwise CW or counterclockwise CCW from a direction in which the light L0 is reflected specularly by the first incident surface 71 as a reference. FIG. 3 indicates, by the dot-and-dash line L70, the direction (first direction P1) in which the light L0 incident from the normal direction of the first incident surface 71 is emitted from the first incident surface 71 at the highest diffraction efficiency in the first diffraction element 70. In the aspect illustrated in FIG. 3, the first direction P1 is clockwise CW.

FIG. 3 illustrates whether a second direction P2 is clockwise CW or counterclockwise CCW assuming that a direction in which the light L0 incident from the normal direction of the second incident surface 51 is emitted from the emitting surface 52 at the highest diffraction efficiency is the "second direction P2" in the second transmission-type diffraction element 50. More specifically, FIG. 3 illustrates whether a direction in which the light L0 incident from the normal direction of the second incident surface 51 is emitted from the emitting surface 52 at the highest diffraction efficiency without being diffracted is clockwise CW or counterclockwise CCW from a direction in which the light L0 passes straight through the second diffraction element 50 as a reference. FIG. 3 indicates, by the dot-and-dash line L50, the direction (second direction P2) in which the light L0 incident from the normal direction of the second incident surface 51 is emitted from the emitting surface 52 at the highest diffraction efficiency in the second diffraction element 50. In the aspect illustrated in FIG. 3, the second direction P2 is counterclockwise CCW.

Specific Example of Configuration of Second Diffraction Element 50 and First Diffraction Element 70

Figure 4:
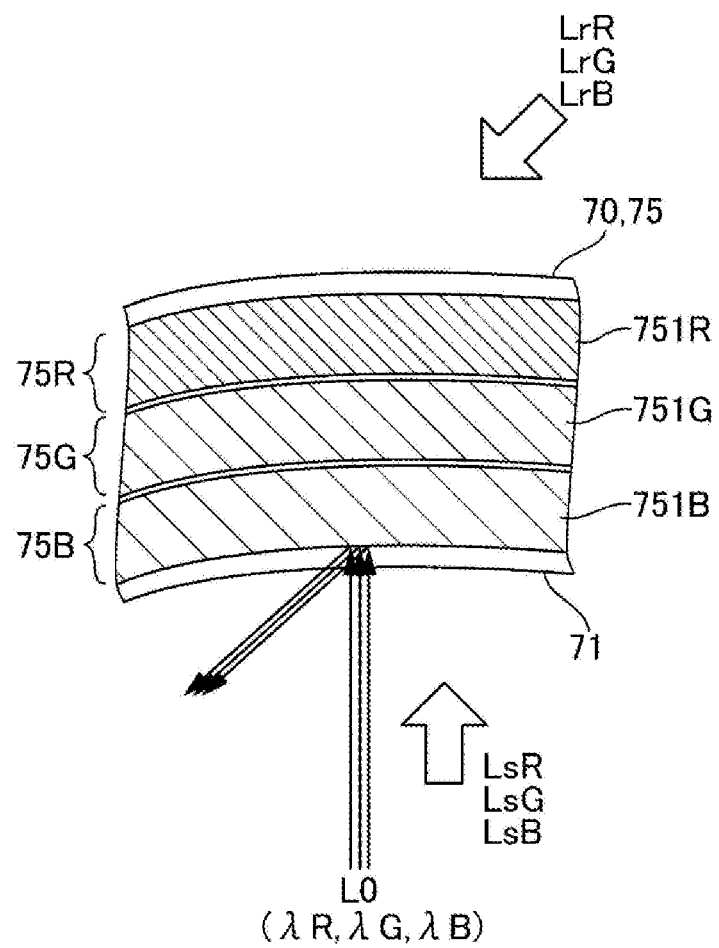
FIG. 4 is a cross-sectional diagram illustrating Specific Example 1 of a configuration of the first diffraction element illustrated in FIG. 2.
Figure 5:
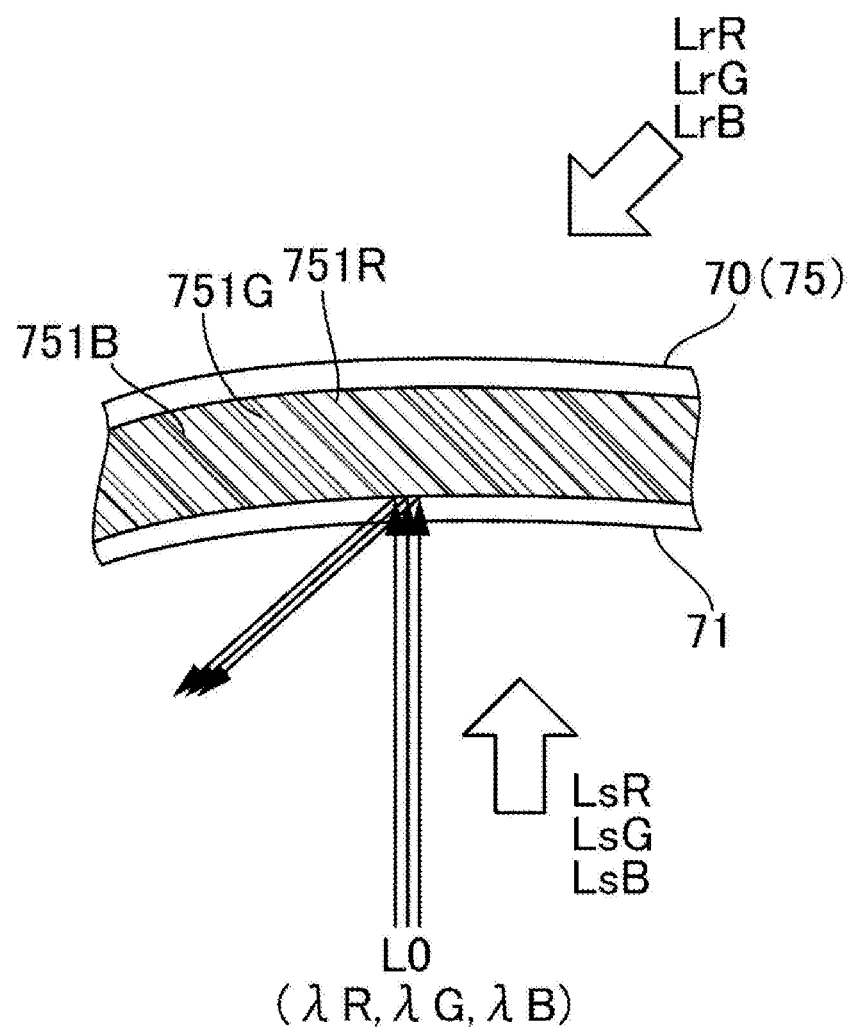
FIG. 5 is a cross-sectional diagram illustrating Specific Example 2 of a configuration of the first diffraction element illustrated in FIG. 2.

FIG. 4 is a cross-sectional diagram illustrating Specific Example 1 of a configuration of the first diffraction element 70 illustrated in FIG. 2. FIG. 5 is a cross-sectional diagram illustrating Specific Example 2 of a configuration of the first diffraction element 70 illustrated in FIG. 2. When the image light L0 is used for color display in the display device illustrated in FIGS. 1 and 2, the second diffraction element 50 and the first diffraction element 70 are formed as illustrated in FIG. 4 or 5. Note that, since the first diffraction element 70 and the second diffraction element 50 have the same basic configuration, FIGS. 4 and 5 illustrate only the first diffraction element 70, and the second diffraction element 50 is omitted from the diagrams.

In the example of the configuration illustrated in FIG. 4, in the first diffraction element 70, reflection-type volume holographic elements 75R, 75G, and 75B are laminated, and interference fringes 751R, 751G, and 751B are respectively formed in the reflection-type volume holographic elements 75R, 75G, and 75B at a pitch corresponding to a specific wavelength. For example, the interference fringes 751R are formed at a pitch corresponding to a wavelength of 615 nm, for example, in a wavelength range from 580 nm to 700 nm. The interference fringes 751G are formed at a pitch corresponding to a wavelength of 535 nm, for example, in a wavelength range from 500 nm to 580 nm. The interference fringes 751B are formed at a pitch corresponding to a wavelength of 460 nm, for example, in a wavelength range from 400 nm to 500 nm. The configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Further, as illustrated in FIG. 5, the interference fringes 751R, 751G, and 751B may be formed in one layer by dispersing a photosensitive material having sensitivity corresponding to the respective wavelengths in the holographic photosensitive layer and then performing interference exposure on the holographic photosensitive layer by using the reference light LrR, LrG, and LrB and the object light LsR, LsG, and LsB having the respective wavelengths.

In the both examples of the configuration illustrated in FIGS. 4 and 5, light having a spherical wave may be used as the reference light LrR, LrG, and LrB and the object light LsR, LsG, and LsB. In this case, the plurality of curved interference fringes 751 are formed to be aligned. Further, "incident direction and emitting direction" for spherical waves can be each defined as a direction extending from a wave source in a direction orthogonal to a plane because a spherical surface approaches the plane in a position away from the wave source. Note that, the first diffraction element 70 may be a surface relief-type diffraction element (blazed grating) having serrated grooves in cross section or a surface relief holographic element (blazed holographic grating) that combines a holographic element and a surface relief-type diffraction element. In either case, diffracted light having the highest diffraction efficiency is emitted in one direction when a light beam is incident from the normal direction.

Wavelength Compensation

Figure 6:
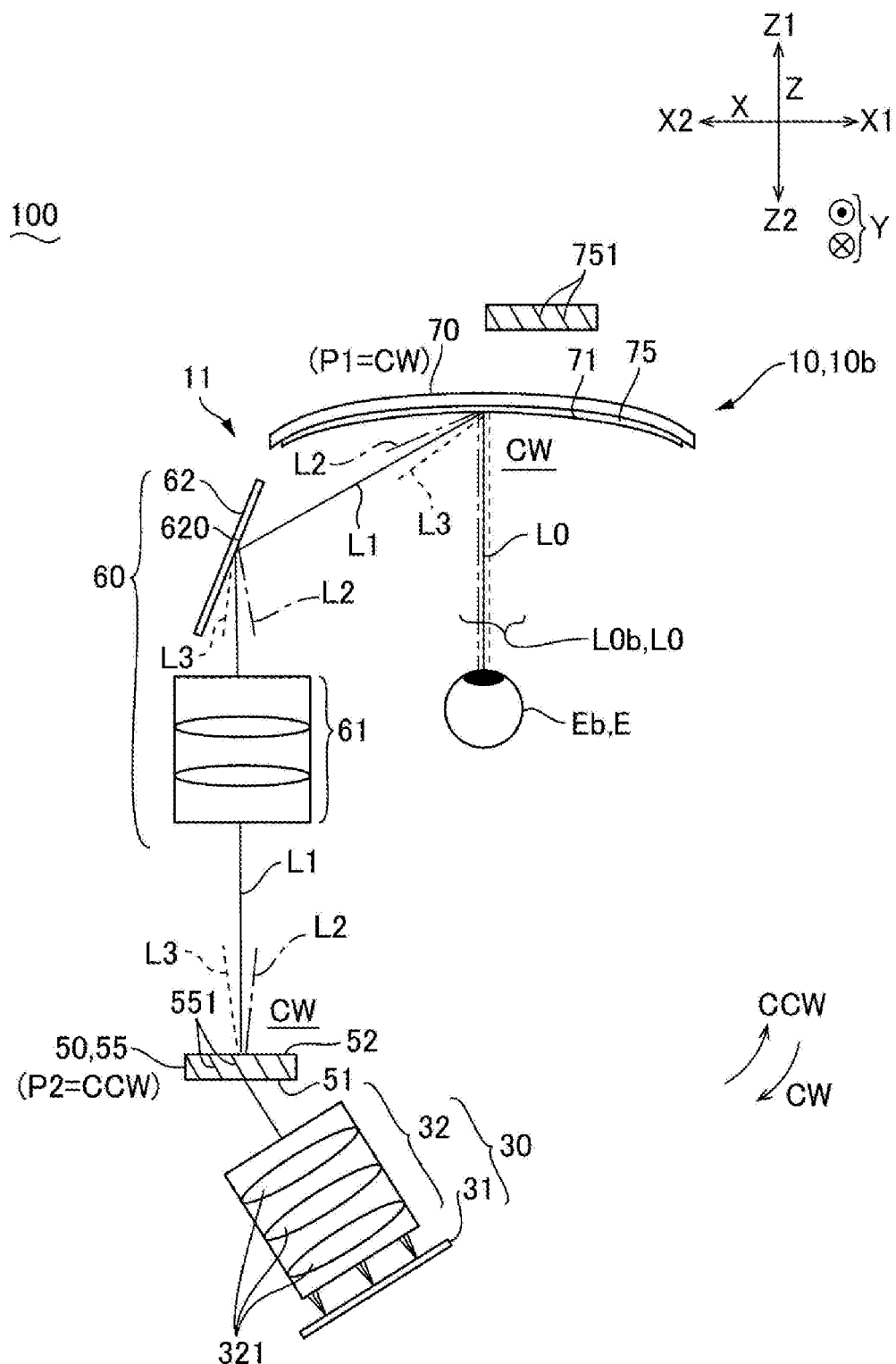
FIG. 6 illustrates a schematic diagram of wavelength compensation at the second diffraction element and the first diffraction element illustrated in FIG. 2.

FIG. 6 is a schematic diagram of wavelength compensation in the second diffraction element 50 and the first diffraction element 70 illustrated in FIG. 2. Note that FIG. 6 illustrates only wavelength compensation in the beam of light at the center of the angle of view, but the same wavelength compensation is also performed on the other beams of light at the angle of view. FIG. 6 illustrates light L1 (solid line) having the specific wavelength of the image light L0. For example, it is assumed that the light L1 is light having a wavelength at an intensity peak of the image light L0. FIG. 6 also illustrates light L2 (dot-and-dash line) on a long wavelength side with respect to the specific wavelength and light L3 (dotted line) on a short wavelength side with respect to the specific wavelength.

In the optical system illustrated in FIG. 6, the image light L0 incident on the second diffraction element 50 is diffracted and deflected by the second diffraction element 50. At this time, the light L2 on the long wavelength side with respect to the specific wavelength has a diffraction angle greater than a diffraction angle of the light L1 having the specific wavelength. Further, the light L3 on the short wavelength side with respect to the specific wavelength has a diffraction angle smaller than a diffraction angle of the light L1 having the specific wavelength. Therefore, the image light L0 emitted from the second diffraction element 50 is deflected and dispersed at each wavelength.

Herein, in the optical path from the second diffraction element 50 to the first diffraction element 70, an intermediate image is generated once, and reflection by the reflection member 62 is performed once. In other words, in the optical path from the second diffraction element 50 to the first diffraction element 70, a sum of the number of times of generating intermediate image and the number of reflections is two, which is an even number.

The first direction P1 in which the diffraction efficiency is the highest when the light is incident from the normal direction of the first incident surface 71 is clockwise CW in the first diffraction element 70. In contrast, in the second diffraction element 50, the direction in which the interference fringes 551 are inclined toward the second incident surface 51 is the same as the direction in which the interference fringes 751 are inclined toward the first incident surface 71 in the first diffraction element 70, and the second direction P2 in which the diffraction efficiency is the highest when the light is incident from the normal direction of the second incident surface 51 is counterclockwise CCW. Therefore, the first direction P1 and the second direction P2 are directions different from each other.

In the second diffraction element 50, an angle (incident angle) which the normal direction of the second incident surface 51 forms with the incident direction of light toward the second incident surface 51 is about 60° approximately, and an angle which the normal direction of the emitting surface 52 of the second diffraction element 50 with the direction in which the light is emitted from the emitting surface 52 at the highest diffraction efficiency is about 0°. Thus, the direction in which the light incident on the first incident surface 71 is diffracted at the highest diffraction efficiency is clockwise CW. The direction in which the light incident on the second incident surface 51 is diffracted at the highest diffraction efficiency is also clockwise CW. The direction (clockwise CW) in which the light incident on the first incident surface 71 is diffracted at the highest diffraction efficiency is the same direction as the direction (clockwise CW) in which the light incident on the second incident surface 51 is diffracted at the highest diffraction efficiency.

Therefore, when the image light L0 is incident on the first incident surface 71 of the first diffraction element 70, the light L2 on the long wavelength side with respect to the specific wavelength has an incident angle greater than an incident angle of the light L1 having the specific wavelength while the light L3 on the short wavelength side with respect to the specific wavelength has an incident angle smaller than the incident angle of the light L1 having the specific wavelength. Further, the light L2 on the long wavelength side with respect to the specific wavelength has a diffraction angle greater than a diffraction angle of the light L1 having the specific wavelength. The light L3 on the short wavelength side with respect to the specific wavelength has a diffraction angle smaller than a diffraction angle of the light L1 having the specific wavelength.

Figure 10:
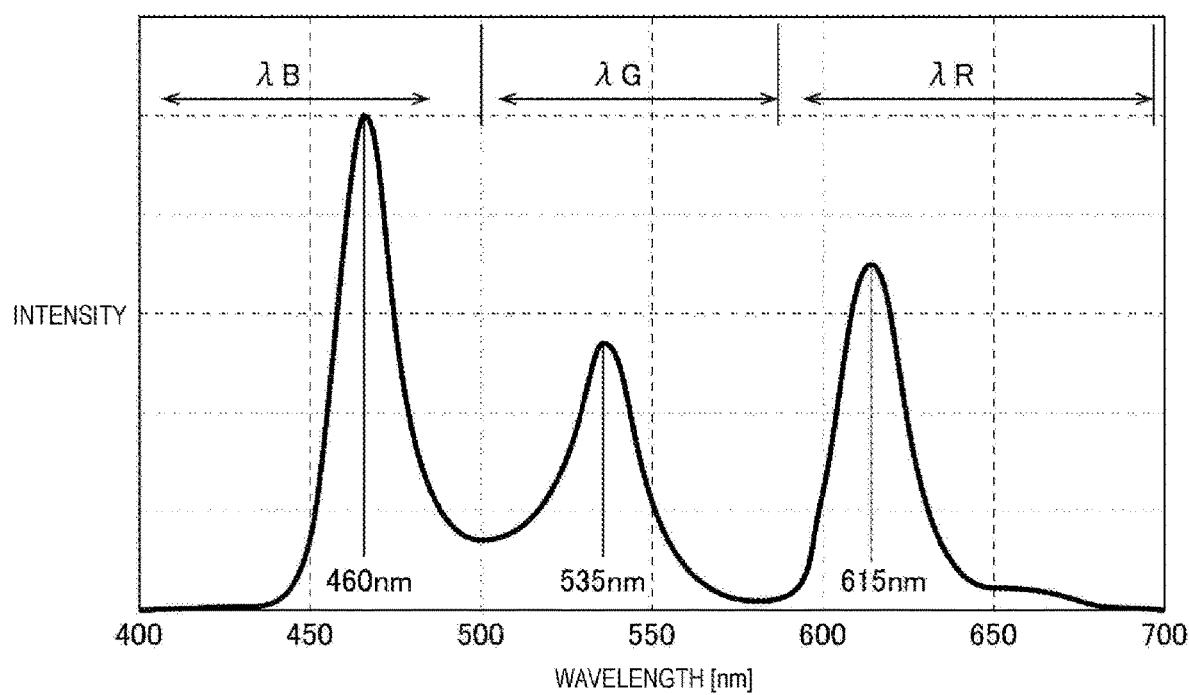

Accordingly, the light L2 on the long wavelength side with respect to the specific wavelength is incident on the first diffraction element 70 at an incident angle greater than an incident angle of the light L1 having the specific wavelength. However, the light L2 on the long wavelength side with respect to the specific wavelength has the diffraction angle greater than the diffraction angle of the light L1 having the specific wavelength. Thus, as a result, the light L2 on the long wavelength side with respect to the specific wavelength and the light L1 having the specific wavelength are substantially parallel light when being emitted from the first diffraction element 70. In contrast, the light L3 on the short wavelength side with respect to the specific wavelength is incident on the first diffraction element 70 at an incident angle smaller than an incident angle of the light L1 having the specific wavelength. However, the light L3 on the short wavelength side with respect to the specific wavelength has the diffraction angle smaller than the diffraction angle of the light L1 having the specific wavelength. Thus, as a result, the light L3 on the short wavelength side with respect to the specific wavelength and the light L1 having the specific wavelength are substantially parallel light when being emitted from the first diffraction element 70. Accordingly, since the image light L0 emitted from the first diffraction element 70 is incident as the substantially parallel light on the eye E of the observer, misalignment of image formation in a retina at each wavelength can be suppressed. Therefore, as illustrated in FIG. 10, even when respective bands λR, λG, and λB of red light (R), green light (G), and blue light (B) have a spectrum width to some extent, a high-resolution color image can be displayed.

Comparative Example

Figure 7:
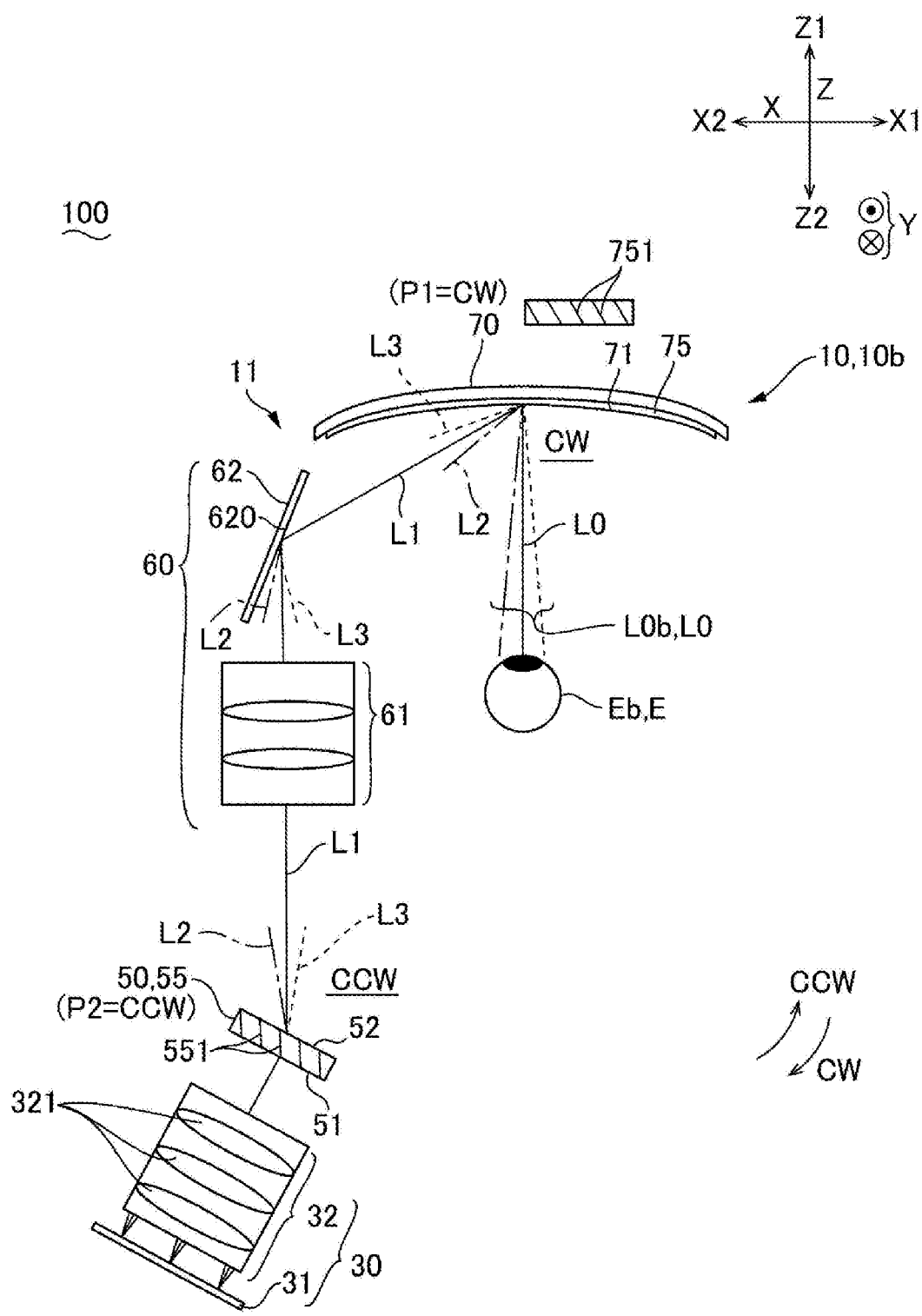
FIG. 7 illustrates a schematic diagram of a comparative example of the invention.

FIG. 7 is a schematic diagram of a comparative example of the invention. The layout of the second diffraction element 50 and the image light projecting device 30 is different from that in the aspect illustrated in FIG. 6, and the other configuration is the same as that in the aspect illustrated in FIG. 6.

In FIG. 7, the image light L0 incident on the second diffraction element 50 is also diffracted and deflected by the second diffraction element 50. At this time, the light L2 on the long wavelength side with respect to the specific wavelength has a diffraction angle greater than a diffraction angle of the light L1 having the specific wavelength. Further, the light L3 on the short wavelength side with respect to the specific wavelength has a diffraction angle smaller than a diffraction angle of the light L1 having the specific wavelength. Therefore, the image light L0 emitted from the second diffraction element 50 is deflected and dispersed at each wavelength.

Herein, in the optical path from the second diffraction element 50 to the first diffraction element 70, an intermediate image is generated once, and reflection by the reflection member 62 is performed once. In other words, similarly to the optical system illustrated in FIG. 6, in the optical path from the second diffraction element 50 to the first diffraction element 70, a sum of the number of times of generating intermediate image and the number of reflections is two, which is an even number.

Further, similarly to the optical system illustrated in FIG. 6, the first direction in which the diffraction efficiency is the highest when the light is incident from the normal direction of the first incident surface 71 is clockwise CW in the first diffraction element 70. In contrast, in the second diffraction element 50, the direction in which the interference fringes 551 are inclined toward the second incident surface 51 is the same as the direction in which the interference fringes 751 are inclined toward the first incident surface 71 in the first diffraction element 70, and the second direction in which the diffraction efficiency is the highest when the light is incident from the normal direction of the second incident surface 51 is counterclockwise CCW. The first direction P1 and the second direction P2 are directions different from each other.

However, unlike the optical system illustrated in FIG. 6, in the second diffraction element 50, an angle (incident angle) which the normal direction of the second incident surface 51 forms with the incident direction of light toward the second incident surface 51 is about 0° approximately, whereas an angle which the normal direction of the emitting surface 52 of the second diffraction element 50 forms with the direction in which the light is emitted from the emitting surface 52 at the highest diffraction efficiency is about 60°. Thus, the direction in which the light incident on the first incident surface 71 is diffracted at the highest diffraction efficiency is clockwise CW, whereas the direction in which the light incident on the second incident surface 51 is diffracted at the highest diffraction efficiency is counterclockwise CCW. The direction (clockwise CW) in which the light incident on the first incident surface 71 is diffracted at the highest diffraction efficiency is a direction different from the direction (counterclockwise CCW) in which the light incident on the second incident surface 51 is diffracted at the highest diffraction efficiency.

Therefore, on the contrary to the aspect illustrated in FIG. 6, on the first incident surface 71 of the first diffraction element 70, the light L2 on the long wavelength side with respect to the specific wavelength has an incident angle smaller than an incident angle of the light L1 having the specific wavelength while the light L3 on the short wavelength side with respect to the specific wavelength has an incident angle greater than the incident angle of the light L1 having the specific wavelength. Herein, the light L2 on the long wavelength side with respect to the specific wavelength has a diffraction angle greater than a diffraction angle of the light L1 having the specific wavelength. The light L3 on the short wavelength side with respect to the specific wavelength has a diffraction angle smaller than a diffraction angle of the light L1 having the specific wavelength. Thus, as a result, when being emitted from the first diffraction element 70, the light L2 on the long wavelength side with respect to the specific wavelength, the light L1 having the specific wavelength, and the light L3 on the short wavelength side with respect to the specific wavelength are emitted in different directions. Accordingly, image formation in a retina at each wavelength is misaligned.

Other Exemplary Embodiments

Figure 8:
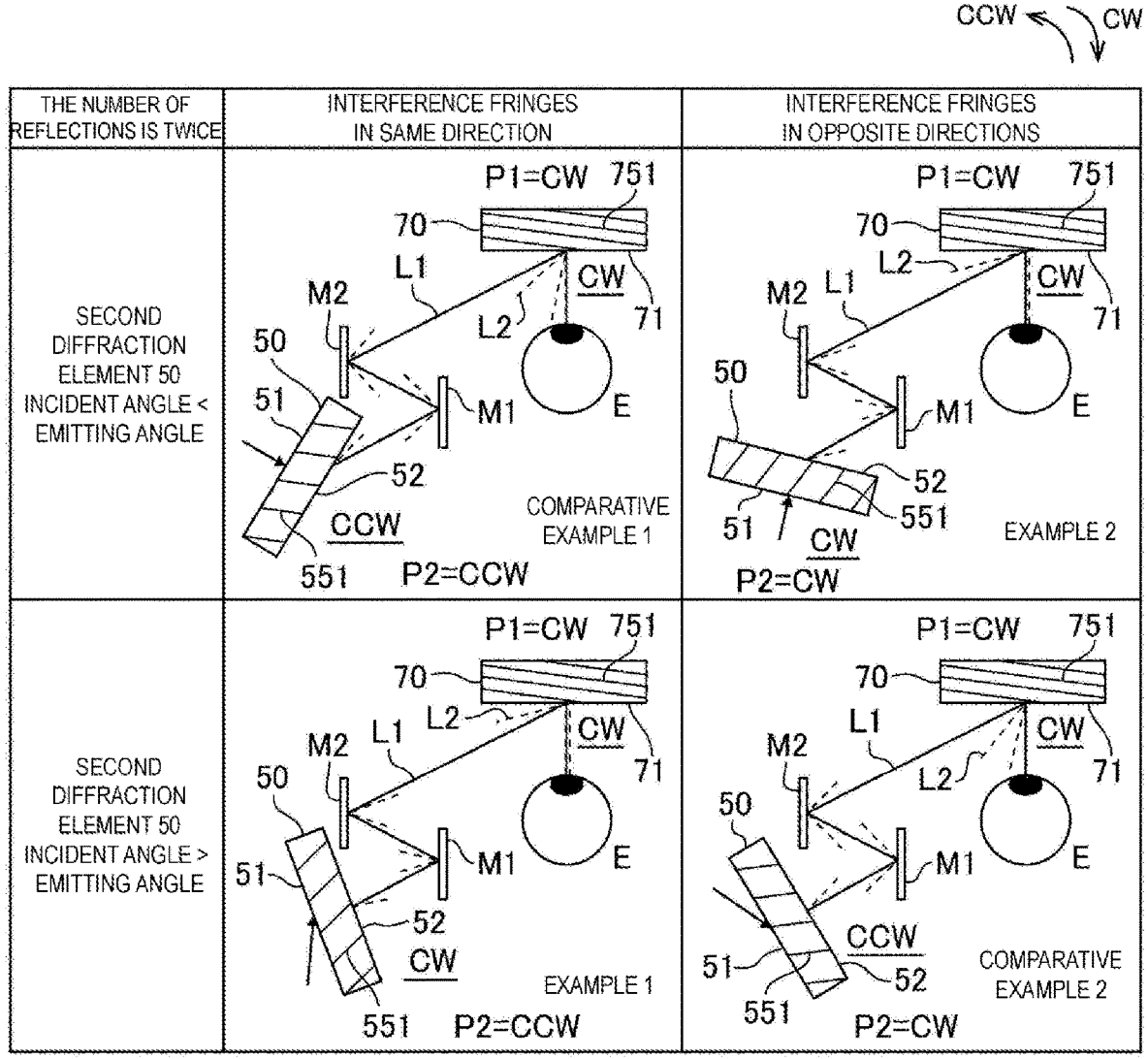
FIG. 8 illustrates a schematic diagram when a sum of the number of reflections and the number of times of generating intermediate image is an even number in the display device to which the invention is applied.
Figure 9:
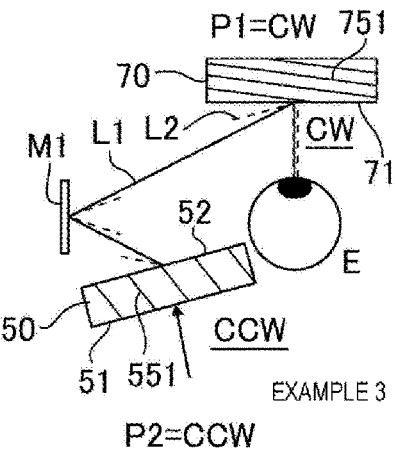
FIG. 9 illustrates a schematic diagram when a sum of the number of reflections and the number of times of generating intermediate image is an odd number in the display device to which the invention is applied.

FIG. 8 is a schematic diagram when a sum of the number of reflections and the number of times of generating intermediate image is an even number in the display device 100 to which the invention is applied. FIG. 9 is a schematic diagram when a sum of the number of reflections and the number of times of generating intermediate image is an odd number in the display device 100 to which the invention is applied. Note that, FIGS. 8 and 9 illustrate examples and comparative examples together. FIGS. 8 and 9 illustrate the first diffraction element 70 having a flat shape. FIGS. 8 and 9 indicate light having an optimum wavelength for pitches of the interference fringes of the first diffraction element 70 and the second diffraction element 50 by a solid line L1, indicate a light beam in which wavelength fluctuations occur on a long wavelength side with respect to the optimum wavelength by a dot line L2, and schematically indicate an inclination direction of the interference fringes 751 and 551 by oblique lines. FIGS. 8 and 9 illustrate the following combinations.

Sum of the number of reflections and the number of times of generating intermediate image=even number (FIG. 8)

P1≠P2 Incident angle of second diffraction element 50>emitting angle . . . Example 1

P1=P2 Incident angle of second diffraction element 50<emitting angle . . . Example 2

Sum of the number of reflections and the number of times of generating intermediate image=odd number (FIG. 9)

P1≠P2 Incident angle of second diffraction element 50<emitting angle . . . Example 3

P1=P2 Incident angle of second diffraction element 50>emitting angle . . . Example 4

In FIG. 8, a sum of the number of reflections of light and the number of times of generating intermediate image between the second diffraction element 50 and the first diffraction element 70 is an even number. More specifically, FIG. 8 exemplifies a state where two mirrors M1 and M2 are disposed between the second diffraction element 50 and the first diffraction element 70.

In Example 1 and Comparative Example 1, in the second diffraction element 50, the direction in which the interference fringes 551 are inclined toward the second incident surface 51 is the same as the direction in which the interference fringes 751 are inclined toward the first incident surface 71 in the first diffraction element 70. Thus, the first direction P1 (clockwise CW) in which the diffraction efficiency is the highest when the light is incident from the normal direction of the first incident surface 71 is a direction different from the second direction P2 (counterclockwise CCW) in which the diffraction efficiency is the highest when the light is incident from the normal direction of the second incident surface 51.

Herein, in Example 1, an angle (incident angle) which the normal direction of the second incident surface 51 forms with the incident direction of light toward the second incident surface 51 is about 60° approximately, whereas an angle which the normal direction of the emitting surface 52 of the second diffraction element 50 forms with the direction in which the light is emitted from the emitting surface 52 at the highest diffraction efficiency is about 0°, and the incident angle is greater than the emitting angle. Thus, the direction (clockwise CW) in which the light incident on the first incident surface 71 is diffracted at the highest diffraction efficiency is the same direction as the direction (clockwise CW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle greater than an incident angle of the light L1 having the specific wavelength. Accordingly, wavelength compensation can be appropriately performed, and thus misalignment of image formation in a retina at each wavelength can be suppressed.

In contrast, in Comparative Example 1, an angle (incident angle) which the normal direction of the second incident surface 51 forms with the incident direction of light toward the second incident surface 51 is about 0° approximately, whereas an angle which the normal direction of the emitting surface 52 of the second diffraction element 50 forms with the direction in which the light is emitted from the emitting surface 52 at the highest diffraction efficiency is about 60°, and the incident angle is smaller than the emitting angle. Thus, the direction (clockwise CW) in which the light incident on the first incident surface 71 is diffracted at the highest diffraction efficiency is a direction different from the direction (counterclockwise CCW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle smaller than an incident angle of the light L1 having the specific wavelength. Accordingly, it is difficult to perform wavelength compensation.

In Example 2 and Comparative Example 2, in the second diffraction element 50, the direction in which the interference fringes 551 are inclined toward the second incident surface 51 is different from the direction in which the interference fringes 751 are inclined toward the first incident surface 71 in the first diffraction element 70. Thus, the first direction P1 (clockwise CW) in which the diffraction efficiency is the highest when the light is incident from the normal direction of the first incident surface 71 is the same direction as the second direction P2 (clockwise CW) in which the diffraction efficiency is the highest when the light is incident from the normal direction of the second incident surface 51.

Herein, in Example 2, an angle (incident angle) which the normal direction of the second incident surface 51 forms with the incident direction of light toward the second incident surface 51 is about 0° approximately, whereas an angle which the normal direction of the emitting surface 52 of the second diffraction element 50 forms with the direction in which the light is emitted from the emitting surface 52 at the highest diffraction efficiency is about 60°, and the incident angle is smaller than the emitting angle. Thus, the direction (clockwise CW) in which the light incident on the first incident surface 71 is diffracted at the highest diffraction efficiency is the same direction as the direction (clockwise CW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle greater than an incident angle of the light L1 having the specific wavelength. Accordingly, wavelength compensation can be appropriately performed, and thus misalignment of image formation in a retina at each wavelength can be suppressed.

In contrast, in Comparative Example 2, an angle (incident angle) which the normal direction of the second incident surface 51 forms with the incident direction of light toward the second incident surface 51 is about 60° approximately, whereas an angle which the normal direction of the emitting surface 52 of the second diffraction element 50 forms with the direction in which the light is emitted from the emitting surface 52 at the highest diffraction efficiency is about 0°, and the incident angle is greater than the emitting angle. Thus, the direction (clockwise CW) in which the light incident on the first incident surface 71 is diffracted at the highest diffraction efficiency is a direction different from the direction (counterclockwise CCW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle smaller than an incident angle of the light L1 having the specific wavelength. Accordingly, it is difficult to perform wavelength compensation.

In this way, when a sum of the number of reflections of light and the number of times of generating intermediate image between the second diffraction element 50 and the first diffraction element 70 is an even number, wavelength compensation can be appropriately performed in a case where the direction in which the light incident on the first incident surface 71 is diffracted at the highest diffraction efficiency is the same as the direction in which the light incident on the second incident surface 51 is diffracted at the highest diffraction efficiency. For example, as in Example 1, when a sum of the number of reflections of light and the number of times of generating intermediate image between the second diffraction element 50 and the first diffraction element 70 is an even number, and the first direction P1 and the second direction P2 are different directions from each other, wavelength compensation can be appropriately performed in a case where the incident angle with respect to the second incident surface 51 is greater than the emitting angle with respect to the emitting surface 52. As in Example 2, when a sum of the number of reflections of light and the number of times of generating intermediate image between the second diffraction element 50 and the first diffraction element 70 is an even number, and the first direction P1 and the second direction P2 are the same direction, wavelength compensation can be appropriately performed in a case where the incident angle with respect to the second incident surface 51 is smaller than the emitting angle with respect to the emitting surface 52. Note that, FIG. 8 illustrates that a sum of the number of reflections of light and the number of times of generating intermediate image between the second diffraction element 50 and the first diffraction element 70 is twice assuming that the sum is an even number, but the sum may be zero, four, six times, and the like.

In FIG. 9, a sum of the number of reflections of light and the number of times of generating intermediate image between the second diffraction element 50 and the first diffraction element 70 is an odd number. More specifically, FIG. 9 exemplifies a state where one mirror M1 is disposed between the second diffraction element 50 and the first diffraction element 70.

In Example 3 and Comparative Example 3, in the second diffraction element 50, the direction in which the interference fringes 551 are inclined toward the second incident surface 51 is the same as the direction in which the interference fringes 751 are inclined toward the first incident surface 71 in the first diffraction element 70. Thus, the first direction P1 (clockwise CW) in which the diffraction efficiency is the highest when the light is incident from the normal direction of the first incident surface 71 is a direction different from the second direction P2 (counterclockwise CCW) in which the diffraction efficiency is the highest when the light is incident from the normal direction of the second incident surface 51.

Herein, in Example 3, an angle (incident angle) which the normal direction of the second incident surface 51 forms with the incident direction of light toward the second incident surface 51 is about 0° approximately, whereas an angle which the normal direction of the emitting surface 52 of the second diffraction element 50 forms with the direction in which the light is emitted from the emitting surface 52 at the highest diffraction efficiency is about 60°, and the incident angle is smaller than the emitting angle. Thus, the direction (clockwise CW) in which the light incident on the first incident surface 71 is diffracted at the highest diffraction efficiency is a direction different from the direction (counterclockwise CCW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle greater than an incident angle of the light L1 having the specific wavelength. Accordingly, wavelength compensation can be appropriately performed, and thus misalignment of image formation in a retina at each wavelength can be suppressed.

In contrast, in Comparative Example 3, an angle (incident angle) which the normal direction of the second incident surface 51 forms with the incident direction of light toward the second incident surface 51 is about 60° approximately, whereas an angle which the normal direction of the emitting surface 52 of the second diffraction element 50 forms with the direction in which the light is emitted from the emitting surface 52 at the highest diffraction efficiency is about 0°, and the incident angle is greater than the emitting angle. Thus, the direction (clockwise CW) in which the light incident on the first incident surface 71 is diffracted at the highest diffraction efficiency is the same direction as the direction (clockwise CW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle smaller than an incident angle of the light L1 having the specific wavelength. Accordingly, it is difficult to perform wavelength compensation.

In Example 4 and Comparative Example 4, in the second diffraction element 50, the direction in which the interference fringes 551 are inclined toward the second incident surface 51 is different from the direction in which the interference fringes 751 are inclined toward the first incident surface 71 in the first diffraction element 70. Thus, the first direction P1 (clockwise CW) in which the diffraction efficiency is the highest when the light is incident from the normal direction of the first incident surface 71 is the same direction as the second direction P2 (clockwise CW) in which the diffraction efficiency is the highest when the light is incident from the normal direction of the second incident surface 51.

Herein, in Example 4, an angle (incident angle) which the normal direction of the second incident surface 51 forms with the incident direction of light toward the second incident surface 51 is about 60° approximately, whereas an angle which the normal direction of the emitting surface 52 of the second diffraction element 50 forms with the direction in which the light is emitted from the emitting surface 52 at the highest diffraction efficiency is about 0°, and the incident angle is greater than the emitting angle. Thus, the direction (clockwise CW) in which the light incident on the first incident surface 71 is diffracted at the highest diffraction efficiency is a direction different from the direction (counterclockwise CCW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle greater than an incident angle of the light L1 having the specific wavelength. Accordingly, wavelength compensation can be appropriately performed, and thus misalignment of image formation in a retina at each wavelength can be suppressed.

In contrast, in Comparative Example 4, an angle (incident angle) which the normal direction of the second incident surface 51 forms with the incident direction of light toward the second incident surface 51 is about 0° approximately, whereas an angle which the normal direction of the emitting surface 52 of the second diffraction element 50 forms with the direction in which the light is emitted from the emitting surface 52 at the highest diffraction efficiency is about 60°, and the incident angle is smaller than the emitting angle.

Thus, the direction (clockwise CW) in which the light incident on the first incident surface 71 is diffracted at the highest diffraction efficiency is the same direction as the direction (clockwise CW) in which the light incident on the second incident surface 51 is diffracted at the highest diffraction efficiency. Therefore, when the image light L0 is incident on the first incident surface 71 of the first diffraction element 70, the light L2 on the long wavelength side with respect to the specific wavelength has an incident angle smaller than an incident angle of the light L1 having the specific wavelength. Accordingly, it is difficult to perform wavelength compensation.

In this way, when a sum of the number of reflections of light and the number of times of generating intermediate image between the second diffraction element 70 and the first diffraction element 50 is an odd number, wavelength compensation can be appropriately performed in a case where the direction in which the light incident on the first incident surface 71 is diffracted at the highest diffraction efficiency is different from the direction in which the light incident on the second incident surface 51 is diffracted at the highest diffraction efficiency. For example, as in Example 3, when a sum of the number of reflections of light and the number of times of generating intermediate image between the second diffraction element 70 and the first diffraction element 50 is an odd number, and the first direction P1 and the second direction P2 are different directions from each other, wavelength compensation can be appropriately performed in a case where the incident angle with respect to the second incident surface 51 is smaller than the emitting angle with respect to the emitting surface 52. As in Example 4, when a sum of the number of reflections of light and the number of times of generating intermediate image between the second diffraction element 70 and the first diffraction element 50 is an odd number, and the first direction P1 and the second direction P2 are the same direction, wavelength compensation can be appropriately performed in a case where the incident angle with respect to the second incident surface 51 is greater than the emitting angle with respect to the emitting surface 52. Note that, FIG. 9 illustrates that a sum of the number of reflections of light and the number of times of generating intermediate image between the second diffraction element 50 and the first diffraction element 70 is once assuming that the sum is an odd number, but the sum may be three, five, seven times, and the like.

Other Exemplary Embodiments

A liquid crystal device and an organic electroluminescent display device are used as the image light generating device 31 in the above-described exemplary embodiment, but the invention may be applied to a display device that generates image light by an image generating device using a micromirror device.

The entire disclosure of Japanese Patent Application No. 2018-011305, filed Jan. 26, 2018 is expressly incorporated by reference herein.

What is claimed is:

1. A display device comprising:
   an image light generating device configured to emit image light;
   a first diffraction element of a reflection type configured to deflect the image light incident on a first incident surface toward an eye of an observer; and
   a transmission-type second diffraction element disposed in an optical path between the image light generating device and the first diffraction element and configured to deflect the image light incident on a second incident surface toward the first diffraction element, wherein
   the first diffraction element and the second diffraction element are disposed in such a way that,
   when a sum of the number of reflections of light and the number of times of generating intermediate image between the second diffraction element and the first diffraction element is an even number, a direction in which light incident on the first incident surface is diffracted at the highest diffraction efficiency is the same direction as a direction in which light incident on the second incident surface is diffracted at the highest diffraction efficiency when seen from a normal direction of a virtual surface including a normal direction of the first incident surface and a normal direction of the second incident surface, and
   when a sum of the number of reflections of light and the number of times of generating intermediate image between the second diffraction element and the first diffraction element is an odd number, a direction in which light incident on the first incident surface is diffracted at the highest diffraction efficiency is a direction different from a direction in which light incident on the second incident surface is diffracted at the highest diffraction efficiency when seen from the normal direction of the virtual surface.

2. The display device according to claim 1, wherein
   the first diffraction element is an element in which light incident from the normal direction of the first incident surface has the highest diffraction efficiency in a first direction,
   the second diffraction element is an element in which light incident from the normal direction of the second incident surface has the highest diffraction efficiency in a second direction,
   when a sum of the number of reflections of light and the number of times of generating intermediate image between the second diffraction element and the first diffraction element is an even number and the first direction and the second direction are directions different from each other when seen from the normal direction of the virtual surface including the normal direction of the first incident surface and the normal direction of the second incident surface, an angle which the normal direction of the second incident surface forms with an incident direction of light with respect to the second incident surface is greater than an angle which the normal direction of the second incident surface forms with a direction in which the light is emitted from an emitting surface of the second diffraction element at the highest diffraction efficiency, and
   when a sum of the number of reflections of light and the number of times of generating intermediate image between the second diffraction element and the first diffraction element is an even number and the first direction and the second direction are the same direction when seen from the normal direction of the virtual surface including the normal direction of the first incident surface and the normal direction of the second incident surface, an angle which the normal direction of the second incident surface forms with an incident direction of light with respect to the second incident surface is smaller than an angle which the normal direction of the emitting surface forms with the direction in which the light is emitted from the emitting surface at the highest diffraction efficiency.

3. The display device according to claim 1, wherein
the first diffraction element is an element in which light incident from the normal direction of the first incident surface has the highest diffraction efficiency in a first direction,
the second diffraction element is an element in which light incident from the normal direction of the second incident surface has the highest diffraction efficiency in a second direction,
when a sum of the number of reflections of light and the number of times of generating intermediate image between the second diffraction element and the first diffraction element is an odd number and the first direction and the second direction are directions different from each other when seen from the normal direction of the virtual surface including the normal direction of the first incident surface and the normal direction of the second incident surface, an angle which the normal direction of the second incident surface forms with an incident direction of light with respect to the second incident surface is smaller than an angle which the normal direction of the second incident surface forms with a direction in which the light is emitted from an emitting surface of the second diffraction element at the highest diffraction efficiency, and
when a sum of the number of reflections of light and the number of times of generating intermediate image between the second diffraction element and the first diffraction element is an odd number and the first direction and the second direction are the same direction when seen from the normal direction of the virtual surface including the normal direction of the first incident surface and the normal direction of the second incident surface, an angle which the normal direction of the second incident surface forms with an incident direction of light with respect to the second incident surface is greater than an angle which the normal direction of the emitting surface forms with the direction in which the light is emitted from the emitting surface at the highest diffraction efficiency.

4. The display device according to claim 1, wherein
the first diffraction element is a reflection-type volume holographic element, and
the second diffraction element is a transmission-type volume holographic element.

5. The display device according to claim 4, wherein
the first diffraction element and the second diffraction element are each provided with interference fringes of a plurality of kinds having different pitches.

6. The display device according to claim 1, wherein
the first diffraction element has a curved shape being recessed with respect to a peripheral portion.

7. The display device according to claim 1, wherein
the image light generating device includes an organic electroluminescent display device.

8. The display device according to claim 1, wherein
the image light generating device includes a liquid crystal device and an illumination light source.

9. A light-guiding device comprising:
a first diffraction element of a reflection type configured to deflect light incident on a first incident surface from a light source; and
a second diffraction element of a transmission type disposed in an optical path between the light source and the first diffraction element and configured to deflect the light incident on a second incident surface toward the first diffraction element, wherein
the first diffraction element and the second diffraction element are disposed in such a way that,
when a sum of the number of reflections of light and the number of times of generating intermediate image between the second diffraction element and the first diffraction element is an even number, a direction in which light incident on the first incident surface is diffracted at the highest diffraction efficiency is the same direction as a direction in which light incident on the second incident surface is diffracted at the highest diffraction efficiency when seen from a normal direction of a virtual surface including a normal direction of the first incident surface and a normal direction of the second incident surface, and
when a sum of the number of reflections of light and the number of times of generating intermediate image between the second diffraction element and the first diffraction element is an odd number, a direction in which light incident on the first incident surface is diffracted at the highest diffraction efficiency is a direction different from a direction in which light incident on the second incident surface is diffracted at the highest diffraction efficiency when seen from the normal direction of the virtual surface.

* * * * *